United States Patent [19]
Bohn

[11] Patent Number: 6,064,062
[45] Date of Patent: May 16, 2000

[54] OPTICAL STRAY LIGHT BAFFLE FOR IMAGE SCANNER

[75] Inventor: David D. Bohn, Fort Collins, Colo.

[73] Assignee: Hewlett-Packard Company, Palo Alto, Calif.

[21] Appl. No.: 09/088,973

[22] Filed: Jun. 2, 1998

[51] Int. Cl.[7] .................................. G02B 6/10; H01J 3/14
[52] U.S. Cl. .................................. 250/237 R; 250/208.1; 250/234; 358/483
[58] Field of Search .................................. 250/216, 208.1, 250/234, 235, 237 R; 358/471, 473, 474, 482, 483, 484, 494, 496, 497

[56] References Cited

U.S. PATENT DOCUMENTS

| | | |
|---|---|---|
| 5,089,712 | 2/1992 | Holland . |
| 5,306,908 | 4/1994 | McConica et al. . |
| 5,381,020 | 1/1995 | Kochis et al. . |
| 5,552,597 | 9/1996 | McConica . |
| 5,578,813 | 11/1996 | Allen et al. . |
| 5,586,212 | 12/1996 | McConica et al. . |
| 5,946,433 | 8/1999 | Yamamoto et al. ........................ 385/36 |

FOREIGN PATENT DOCUMENTS

403030472A  2/1991  Japan .

*Primary Examiner*—John R. Lee

[57] ABSTRACT

A stray light baffle for reducing an amount of stray light incident on a detector may comprise a main body portion and a mounting pad portion. The mounting pad portion is affixed to a mounting surface with a light curable adhesive. The stray light baffle substantially blocks stray light and substantially transmits curing light. The mounting surface is located adjacent the detector so that the main body portion of the stray light baffle is interposed between the detector and a source of stray light when the stray light baffle is mounted to the mounting surface.

27 Claims, 5 Drawing Sheets

OPTICAL STRAY LIGHT BAFFLE FOR IMAGE SCANNER

FIELD OF THE INVENTION

This invention relates to scanner devices in general and more specifically to a system for reducing stray light incident on detectors employed in hand-held scanner devices.

BACKGROUND

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete by any convenient means, such as via a cable or an optical infrared data link.

Hand-held or portable optical scanners are wellknown in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to direct and focus the image of the illuminated scan line onto the surface of the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital data then may be processed and/or stored as desired.

While portable image scanners of the type described above are being used, they are not without their problems. For example, the quality of the image data produced by a scanner is usually related to the quality of the image light incident on the detector array. If stray light reaches a detector along with the image light the quality of the resulting image data is degraded. Consequently, a need exists for a device which reduces stray light incident on detectors in hand-held scanner devices.

SUMMARY

A stray light baffle for reducing an amount of stray light incident on a detector may comprise a main body portion and a mounting pad portion. The mounting pad portion is affixed to a mounting surface with a light curable adhesive. The main body portion and the mounting pad portion substantially block stray light and substantially transmit curing light. The mounting surface is located adjacent the detector so that the main body portion of the stray light baffle is interposed between the detector and a source of stray light when the stray light baffle is mounted to the mounting surface.

Also disclosed is a method for mounting a stray light baffle adjacent an optical detector that comprises the steps of: providing an adhesive which cures in the presence of curing light; depositing the adhesive on a mounting surface in proximity with the optical detector; providing a baffle which substantially transmits the curing light and substantially blocks stray light; placing the baffle in contact with the adhesive layer; and illuminating the adhesive layer with curing light through the baffle for a time sufficient to cure the adhesive layer.

BRIEF DESCRIPTION OF THE DRAWING

Illustrative and presently preferred embodiments of the invention are shown in the accompanying drawing, in which.

DESCRIPTION OF THE PREFERRED EMBODIMENT

A stray light baffle 10 according to the present invention may be used in a hand-held or portable image scanner 12 to scan an object 14, such as a document 16 with written text 18 provided thereon. For example, in the application illustrated in FIG. 1, the entire document 16 may be scanned by moving the portable image scanner 12 over the document 16 along a meandering or curvilinear scanning path 20. As will be explained in greater detail below, the stray light baffle 10 associated with the portable image scanner 12 significantly reduces or eliminates the amount of stray light incident on a detector 50, thereby generally improving the quality of the image data (not shown) produced by the detector 50.

Figure 2:
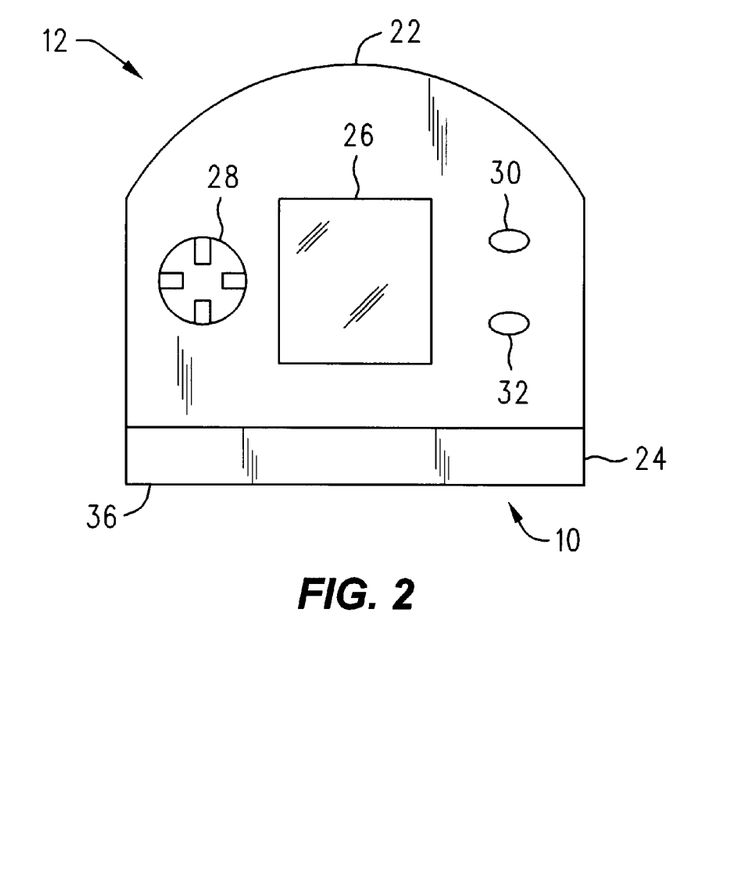
FIG. 2 is a front view of the portable scanner device shown in FIG. 1.
Figure 3:
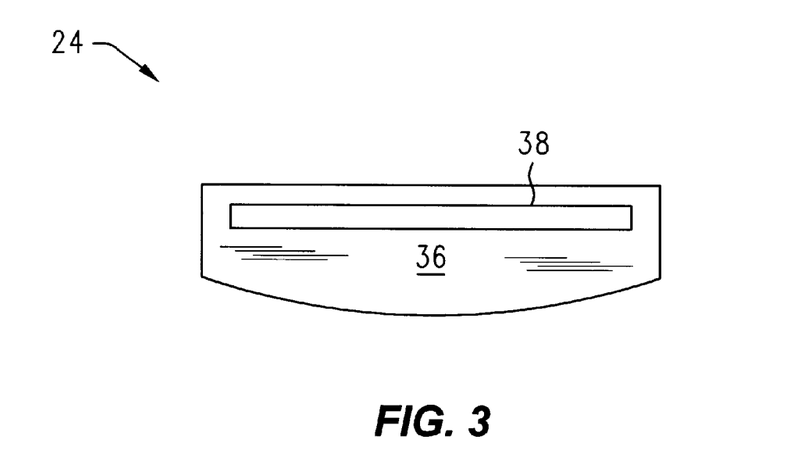
FIG. 3 is a bottom view of the portable scanner device showing the contact surface of the image head.
Figure 4:
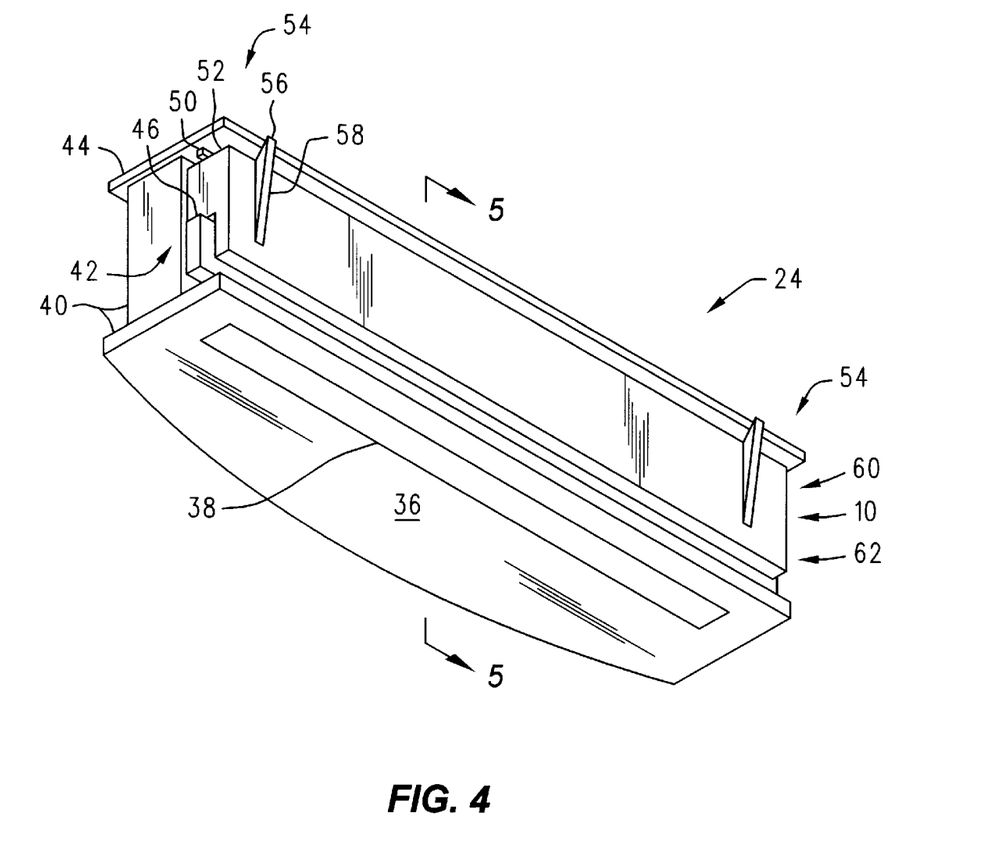
FIG. 4 is a perspective view of the image head of the portable scanner device.
Figure 5:
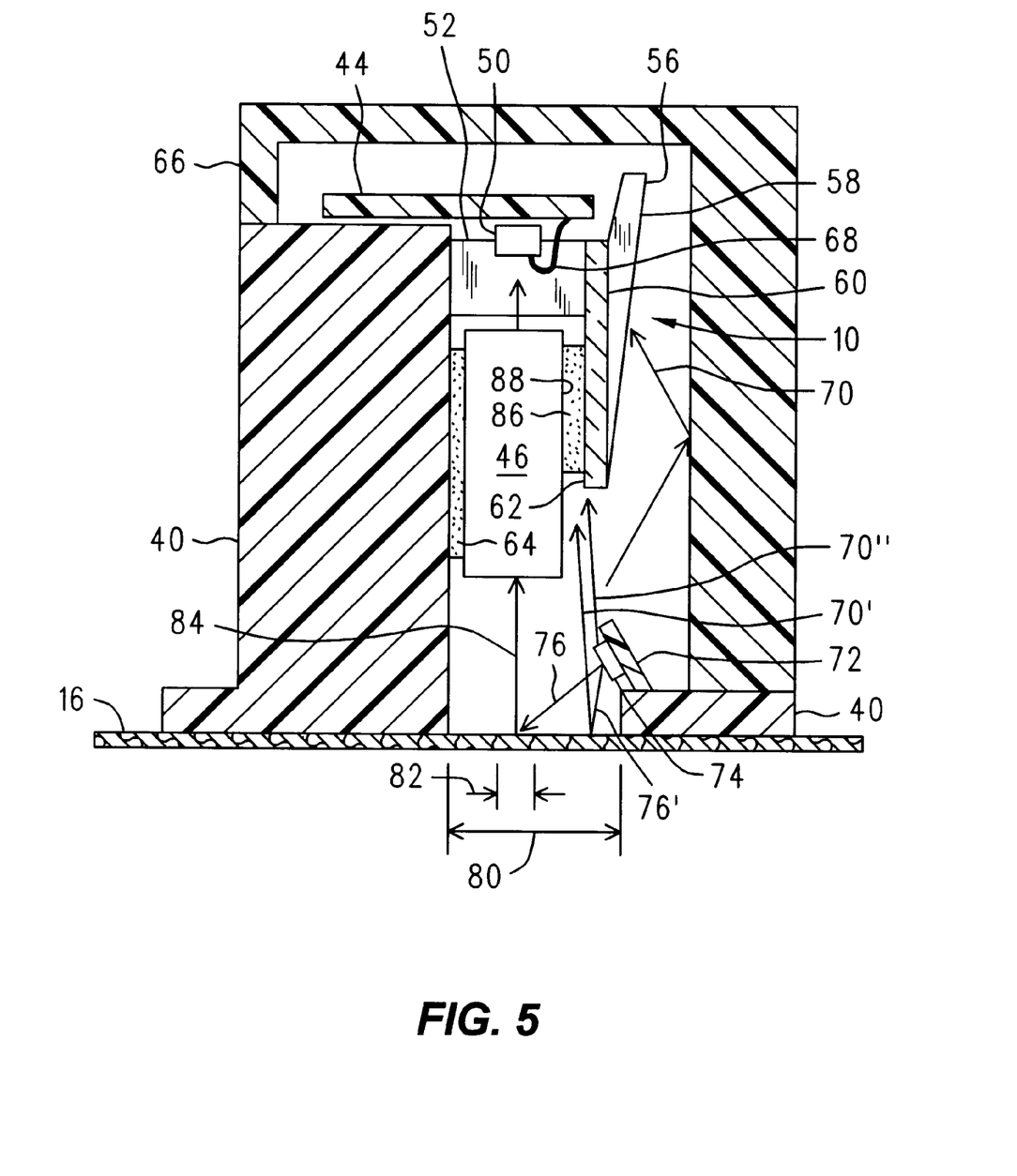
FIG. 5 is a cross-sectional view of the image head of the portable scanner device taken along the line 5—5 of FIG. 4.

Referring now to FIGS. 2, 4, and 5 simultaneously, one embodiment of the portable image scanner 12 may comprise a main housing portion 22 having an image head portion 24 associated therewith. The main housing portion 22 of the portable image scanner 12 may be sized to receive the various electronic components and other devices (not shown) required for the operation of the portable image scanner 12. For example, in addition to housing the various electronic components (not shown) that may be required or desired for the operation of the portable image scanner 12, the main housing portion 22 may also be provided with a display device 26, along with various buttons or switches 28, 30, and 32 to control the function and operation of the portable image scanner 12. The main housing portion 22 may also be sized to receive a suitable power source, such as a battery (not shown), to provide electrical power to the portable image scanner 12.

The image head portion 24 of portable image scanner 12 is best seen in FIG. 5 and may be configured to receive a light source assembly 72, an image sensing system 42 and the stray light baffle 10. The face or contact surface 36 of the image head portion 24 may be provided with an elongate aperture or slot 38 therein which allows the light source assembly 72 to illuminate a scan region 80 on the object 14. The aperture or slot 38 also allows image light 84 reflected by the illuminated scan region 80 to be received by the image sensing system 42. The image sensing system 42 produces an image signal (not shown) based on the image light 84. Image data contained in the image signal may then be processed or manipulated by an image processing system (not shown) to produce image data that are representative of the object 14.

Figure 8:
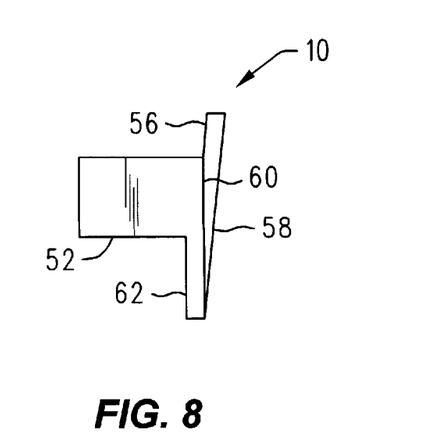
FIG. 8 is a side view of the stray light baffle.

As was briefly mentioned above, the stray light baffle 10 significantly reduces or eliminates the amount of stray light (e.g., 70, 70', and 70", FIG. 5) incident on the detector 50 associated with the image sensing system 42. In one embodiment the stray light baffle 10 may comprise a main body portion 60 and a mounting pad portion 62. See FIG. 8. The main body portion 60 is configured and positioned so as to be interposed between the detector 50 and a source of stray light (e.g., 70, 70', and 70"), thus reducing the amount of stray light incident on the detector 50. The mounting pad portion 62 of stray light baffle 10 is mounted to a mounting surface 88. In one embodiment the mounting surface 88 may comprise an optical system 46 associated with the image sensing system 42. Alternatively, the mounting surface 88 may comprise any suitable surface which would interpose the main body portion 60 of the stray light baffle 10 between the detector 50 and a source of stray light 70, 70', and 70". The stray light baffle 10 also acts as a cover or shield for the detector 50, which may otherwise be exposed during assembly and vulnerable to physical damage.

In one embodiment, the main body portion 60 and the mounting pad portion 62 of the stray light baffle 10 are constructed of a material which substantially transmits light having certain wavelengths (e.g., curing light) and which substantially blocks light having other wavelengths (e.g., stray light). The ability of the material comprising the stray light baffle 10 to substantially transmit light having certain wavelengths, such as curing light, while at the same time blocking light of other wavelengths (e.g., stray light) allows the stray light baffle 10 to be secured or mounted with a light curable adhesive, while at the same time preventing such stray light from reaching the detector 50.

The stray light baffle 10 may be mounted to the mounting surface 88 by applying an appropriate amount of light curable adhesive 46 (e.g., an ultra-violet curable adhesive) to the mounting pad portion 62 and positioning the mounting pad portion 62 against the mounting surface 88. The light curable adhesive 86 may then be cured by directing curing light (e.g., ultraviolet light) through the stray light baffle 10 so that it is incident on the adhesive 86.

The portable image scanner 12 may be operated as follows to scan an object 14, such as document 16 with written text 18 thereon. As a first step, the user (not shown) would set up or initialize the portable image scanner 12 to perform the scanning operation by actuating the appropriate buttons or switches (e.g., 28, 30, and 32) in accordance with the particular operational sequence for the specific scanner device. The user may then place the contact surface or face 36 of the portable image scanner 12 against the document 16 and initiate the scanning operation. The light source assembly 72 produces light rays 76 and 76' to illuminate the scan region 80 of the document 16. Image light 84 is reflected by the document 16 and passes through the optical system 46, which directs and focuses the image light 84 on the detector 50. Stray light rays 70' reflected from the scan region 80 of the document 16 may be directed towards the detector 50 in an unfocused, scattered manner, but will be substantially blocked by the main body portion 60 of the stray light baffle 10. Other stray light rays, such as the stray light rays 70, that would otherwise be incident on the detector 50 will be also be substantially blocked by the stray light baffle 10.

A significant advantage of the stray light baffle 10 according to the present invention is that it reduces or eliminates the amount of stray light incident on the detector 50, thereby generally improving the quality of the image data produced by the detector 50. Another advantage of the stray light baffle 10 is that it forms a shield or cover over the detector 50, thereby protecting the detector 50 against mechanical damage that may otherwise occur during assembly of the scanner device 12.

Still other advantages are associated with the material comprising the stray light baffle 10. For example, the ability of the material to substantially transmit light in the curing light range allows the stray light baffle 10 to be secured by a light (e.g., uv) curable adhesive, while at the same time allowing the stray light baffle 10 to substantially block light in other wavelength ranges, such as stray light. The ability to secure the stray light baffle 10 with a light (e.g., uv) curable adhesive speeds assembly time and reduces the likelihood of subsequent optical degradation due to outgassing which is common with many types of non-light curable adhesives.

Having briefly described the stray light baffle 10 and its use in a portable image scanner 12, as well as some of its more significant features and advantages, the various embodiments of the stray light baffle 10 will now be described in detail. However, before proceeding with the detailed description it should be noted that while the stray light baffle 10 is shown and described herein as it could be used in a portable image scanner 12, it is not limited to use with any particular type or style of scanner device. For example, the stray light baffle 10 could also be used in a flatbed scanner. It should also be noted that while the portable image scanner 12 is shown and described herein as it may be used to scan an object 14, such as a document 16 with written text 18 thereon, it is not limited to use with any particular type of object 14. Indeed, the portable image scanner 12 may be used to scan almost any type of object imaginable. Accordingly, the stray light baffle 10 according to the present invention should not be regarded as limited to the particular type of portable scanner device and applications shown and described herein.

With the foregoing considerations in mind, one embodiment of the stray light baffle 10 is shown and described herein as it could be used in a portable or hand-held image scanner 12 which may be used to scan an object 14, such as a document 16 with written text 18 thereon. See FIG. 1. In order to scan the entire document 16, it may be necessary for the user to move the portable image scanner 12 along a curvilinear or meandering scanning path 20. If so, the portable scanner device 12 may be provided with a navigation system (not shown) to allow image data (not shown) obtained along the meandering or curvilinear scanning path 20 to be "stitched" together to provide image data representative of the entirety of the scanned object 14. Exemplary navigation systems and stitching algorithms are disclosed in U.S. Pat. No. 5,089,712 of Holland for "Sheet Advancement Control System Detecting Fiber Pattern of Sheet" and U.S. Pat. No. 5,578,813 of Allen, et al., for "Freehand Image Scanning Device which Compensates for Non-Linear Movement," both of which are specifically incorporated herein by reference for all that they disclose. However, since the details of the navigation system and stitching algorithm that may be used in such a portable image scanner 12 are not necessary to understand or practice the present invention, the particular navigation system and stitching algorithm that may be utilized in one preferred embodiment of the portable image scanner 12 will not be described in further detail herein.

Figure 1:
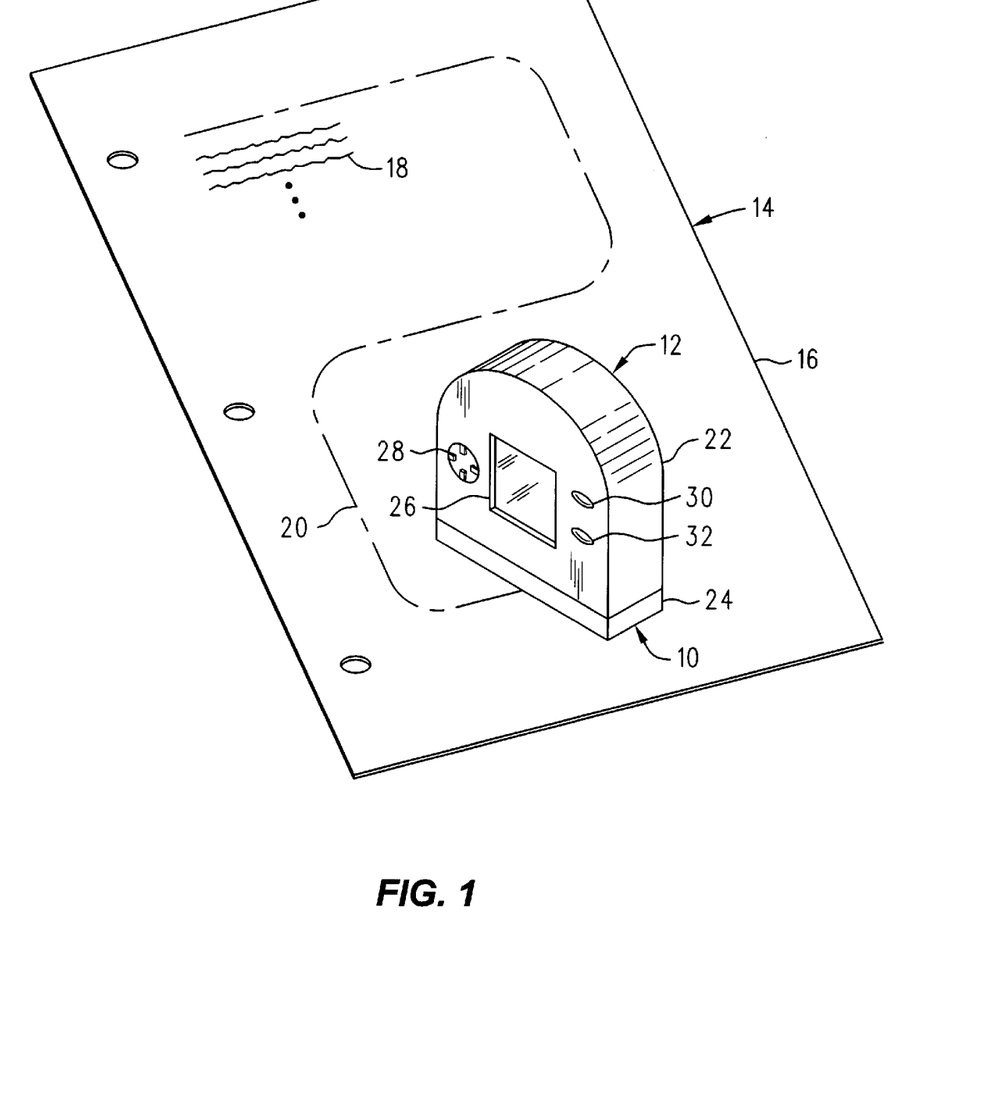
FIG. 1 is a perspective view of a portable scanner device.

Referring now primarily to FIGS. 1–2, the portable image scanner 12 may be provided with a main housing portion 22 and an image head portion 24. The main housing portion 22 may comprise an overall configuration or shape conducive to hand manipulation by a user (not shown), although other configurations may also be used. In one preferred embodiment, the main housing portion 22 may be sized to receive the various electronic components (not shown) required for the operation of the portable image scanner 12. Alternatively, some or all of the various electronic components may be located elsewhere and may be connected to the main housing portion 22 by a suitable link, such as a cable (not shown). The main housing portion 22 may also be provided with a display device 26 and various switching devices 28, 30, and 32 that may be required or desired for the operation of the portable image scanner 12. While the switching devices 28, 30, and 32 in one preferred embodiment are located on the front face of the main housing portion 22 of the portable image scanner 12, they may be positioned at any convenient location on the scanner 12. The electrical power required to operate the portable image scanner 12 may be provided by a suitable electrical power source, such as a battery (not shown), that may also be contained within the main housing portion 22 of the portable image scanner 12. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the portable image scanner 12 will not be described in further detail herein.

The main housing portion 22 of the portable image scanner 12 may be made from any of a wide range of materials, such as metals or plastics, suitable for the intended application. By way of example, in one preferred embodiment, the main housing portion 22 is made from polycarbonate plastic, although other materials could also be used.

Referring now primarily to FIGS. 2, 4, and 5, the image head portion 24 may be sized to receive the light source assembly 72, the image sensing system 42, and the stray light baffle 10. Generally, the light source assembly 72 illuminates the document 16, the image sensing system 42 produces image data (not shown) in response to the illuminated document 16, and the stray light baffle 10 reduces the amount of stray light (e.g., 70, 70', and 70") incident on the image sensing system 42 which would otherwise degrade the resulting image data.

The image head portion 24 of the portable image scanner 12 may comprise a separate assembly that is attached to the main housing portion 22. Alternatively, the image head portion 24 may comprise an integral part of the main housing portion 22. If the image head portion 24 comprises an integral part of the main housing portion 22, a housing 40 shown in FIG. 4 may comprise the main housing portion 22. If the image head portion 24 comprises a separate assembly that is attached to the main housing portion 22, the housing 40 for the image head portion 24 may be made from a wide range of materials as discussed above with respect to the main housing portion 22. In one embodiment, the housing 40 may be made of an opaque material, such as polycarbonate plastic, which effectively prevents, stray light rays from reaching the image sensing system 42 from the side adjacent the housing 40. The stray light baffle 10 prevents stray light rays (e.g., 70, 70', and 70") from reaching the image sensing system 42 from the side opposite the housing 40.

The light source assembly 72 produces a plurality of light rays (e.g., 76 and 76') which illuminate a scan region 80 on the document 16, thereby producing either reflected or transmitted image light 84. The light source assembly 72 may comprise any of a wide range of light sources suitable for providing a plurality of light rays (e.g., 76 and 76'). By way of example, in one preferred embodiment, the light source assembly 72 may comprise a suitable board or substrate 72 for supporting a plurality of light emitting diodes 74 which may be positioned in spaced-apart relation on the board 72. The board 72 may have a length that is substantially coextensive with the length of the scan line 82 that is to be provided. In one preferred embodiment, the board 72 may have a length in the range of about 120 mm to about 130 mm (123.2 mm preferred), although other lengths could also be used. Each light emitting diode 74 may comprise an LED part number HSMA-S690, available from Hewlett-Packard Company of Palo Alto, Calif. The number of light emitting diodes 74 provided on the board 72 will depend on the length of the board 72 as well as on the desired intensity of the illumination that is to be provided to the scan region 80. By way of example, in one preferred embodiment, the board 72 may be provided with eighteen (18) separate light emitting diodes 74. The light emitting diodes 74 utilized in one preferred embodiment produce a substantially uniform light output over a wide angle, nearly 180° in some cases. The wide angle of light used to uniformly illuminate the scan region 80 increases the stray light 70, 70', and 70" which would be incident on the detector without the stray light baffle 10.

Essentially, the image sensing system 42 is responsive to image light 84 reflected by or transmitted through an illuminated scan line 82 generally contained within the bounds of the illuminated scan region 80. The image sensing system 42 produces an image signal (not shown) representative of the scan line 82. The image sensing system 42 may comprise any of a wide variety of imaging systems now known or that may be developed in the future that are suitable for producing image data relating to image light 84 reflected by the object 14 being scanned. Consequently, the present invention should not be regarded as limited to any particular type of imaging system or image system configuration. However, by way of example, the imaging system 42 utilized in one preferred embodiment of the invention may include an optical system 46 for directing to the detector 50 image light 84 reflected by the scan line 82 contained within the illuminated scan region 80. The detector 50 produces an image signal (not shown) related to the image light 84.

The optical system 46 used to direct and focus the image light 84 onto the surface of the detector 50 may comprise an optical system such as the type sold under the name SEL-FOC which is a registered trademark of the Nippon Sheet Glass Company, Limited. Alternatively, other types of imaging systems, such as projection imaging systems involving lenses and/or reflectors, could also be used. The optical system 46 may be mounted to the housing 40 using an adhesive layer 64 or by any other suitable means. The detector 50 may comprise a CCD array having a resolution of 300 dpi (dots per inch), such as type TS105, available from Texas Instruments, Inc., of Austin, Tex. Alternatively, other types of detectors having the same or other resolutions could also be used. The detector 50 has a detection field, or a field of view, which is oriented toward the scan line 82, and the optical system 46 is placed between the detection field of the detector 50 and the scan line 82.

Figure 6:
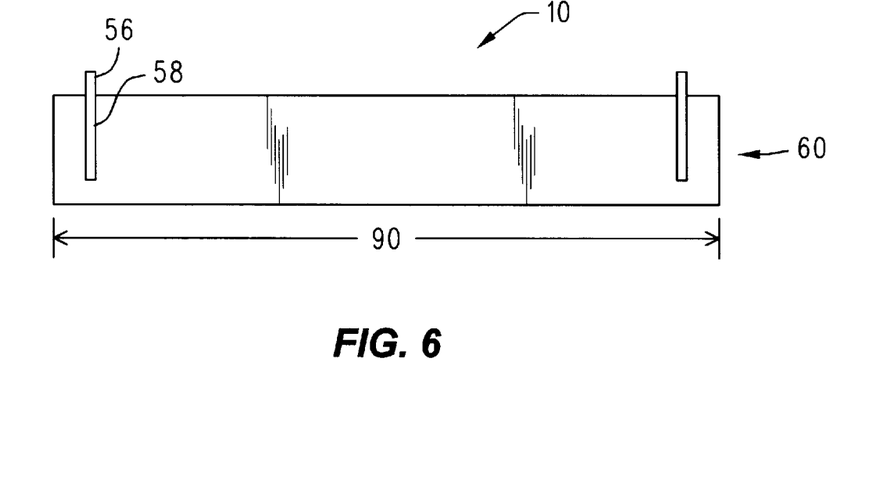
FIG. 6 is a front view of the stray light baffle.
Figure 7:
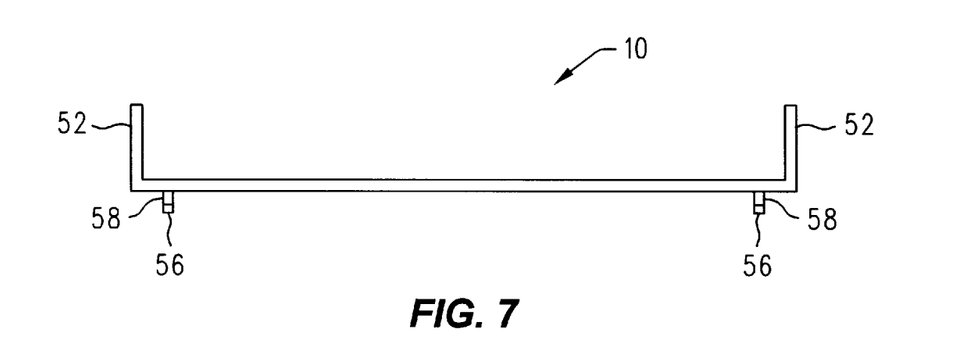
FIG. 7 is a top view of the stray light baffle.

The stray light baffle 10 (FIGS. 6–8) may, in one embodiment, comprise a main body portion 60, a mounting pad portion 62, and side covers 52. The main body portion 60 substantially blocks stray light rays (e.g., 70, 70', and 70") which would otherwise be incident on the detector 50. The main body portion 60 may comprise an elongate rectangle having a length 90 which is substantially coextensive with the detector 50. By way of example, in one embodiment the length 90 of the main body portion 60 may be in the range of about 50 mm to about 210 mm (125.90 mm preferred). The mounting pad portion 62 provides a surface for adhesively mounting the stray light baffle 10 to a mounting surface 88 such as the optical system 46. Side covers 52 may also be provided to block stray light which would otherwise reach the detector 50 from the sides 54 of the image sensing system 42. It should be understood that the shape of the stray light baffle 10 will depend largely on the geometry of the scanner in which it is used, in order to block substantially all potential paths of stray light to the detector 50, and that those skilled in the art may adjust the shape of the stray light baffle 10 without departing from the inventive concepts disclosed herein.

The stray light baffle 10 may also include one or more structural ribs 58 to increase rigidity. The stray light baffle 10 may also be provided with alignment tabs 56 to facilitate alignment of the stray light baffle 10 with a sensor printed circuit board 44 which supports the detector 50. Proper alignment of the stray light baffle 10 may be further facilitated by the side covers 52 which may comprise a rectangular shape and which fit between the optical system 46 and the sensor printed circuit board 44.

The main body portion 60 of the stray light baffle 10 serves a secondary purpose of providing physical protection to the image sensing system 42 by completing the enclosure of the image sensing system 42 formed by the housing 40, the sensor printed circuit board 44, and the optical system 46. The detector 50 is a sensitive component which often includes delicate wire bonds 68. The main body portion 60 of the stray light baffle 10 may extend over the detector 50 and the wire bonds 68 to provide physical protection during manual operations such as assembly or repair of the portable image scanner 12.

The main body portion 60 and the mounting pad portion 62 of the stray light baffle 10 are formed of a material which substantially blocks stray light and substantially transmits curing light, i.e. light with a wavelength required to cure the light curable adhesive 86. The wavelength required to cure the light curable adhesive 86 depends upon the type of light curable adhesive used. In one embodiment, the main body portion 60 and the mounting pad portion 62 are formed of a plastic such as the type sold as LEXAN which is available from the GE company of Huntersville, N.C., with grade HF 1130 and color 21057. The foregoing material has a transmittance between about 50% and about 75% for light having wavelengths in the range of 320 nm to 500 nm (e.g., curing light), where transmittance is a measure of the percentage of light transmitted through a material as a function of the wavelength of the light.

The material selected should substantially block stray light of the wavelengths encountered near the image sensing system 42, such as stray scanner light produced by the light emitting diodes 74. In the preferred embodiment the wavelength of the scanner light is typically in the range of about 580 nm to about 600 nm (590 preferred). The preferred embodiment of the main body portion 60 has a transmittance between about 5% and about 7% for light in the foregoing wavelength range (e.g., stray light). Stray light may be directed at the detector 50 from many sources, such as specular reflections 70' from the document 16, or direct rays 70"0 from the light emitting diodes 74. A cover 66 which may comprise the main housing portion 22 also may cause reflections 70.

The mounting pad portion 62 of the stray light baffle 10 may be mounted to a mounting surface 88 such as the optical system 46 using a light curable adhesive which cures in response to ultraviolet (uv) light having a wavelength in the range of 320 nm to 390 nm, such as DYMAX 191-M-GEL which is available from Dymax Corporation of Torrington, Conn. Using a light curable adhesive 86 greatly facilitates construction of the image head portion 24. For example, the light curable adhesive 86 stays fluid until exposed to curing light, whereas many other adhesives stay fluid for only a limited time. The light curable adhesive 86 also cures rapidly when exposed to curing light (generally less than one minute), thereby speeding manufacturing processes, whereas many other adhesives which cure in response to heat or air, such as silicone, cure more slowly. Thermal cure adhesives have the additional disadvantage of inducing thermal mechanical stress during heat curing, which could damage the image head portion 24. Furthermore, the light curable adhesive 86 does not "outgas", or release gas or water vapor, as do some other types of adhesives, such as cyanoacrylate. Outgassing may release impurities into the image head portion 24 which may cloud the path of the image light 84 or may collect on components such as the detector 50, the optical system 46 and the light emitting diodes 74.

It is generally preferred that the stray light baffle 10 be positioned adjacent the detector 50 so that it is interposed between the detector 50 and sources of stray light (e.g., 70, 70', and 70"). Accordingly, the stray light baffle 10 may block substantially all stray light that would otherwise reach the detector, whether the stray light originates from the light emitting diodes 74, the display device 26, or other sources. To mount the stray light baffle 10 to the optical system 46, the light curable adhesive 86 may be deposited on one or more selected locations on the optical system 46. Alternatively, the adhesive 86 may be deposited on the mounting pad portion 62 of the stray light baffle 10. The alignment tabs 56 and the side covers 52 of the stray light baffle 10 are aligned with the image sensing system 42 and the mounting pad portion 62 pressed against the light curable adhesive 86. Curing light (not shown) having a wavelength capable of curing the light curable adhesive 86 may then be directed through the mounting pad portion 62 so that the curing light is incident on the light curable adhesive 86. For the DYMAX adhesive described above, curing light with a wavelength between about 320 nm and about 390 nm should be directed at the light curable adhesive 86 for a minimum of about 10 seconds with an intensity of about 15000 mW/cm2, or with an intensity of about 4700 mW/cm2 with a wavelength between about 400 nm and about 500 nm.

The light curable adhesive 86 may be spread in a uniform layer over the mounting surface 88 or may be deposited in selected target areas. Preferably, the target areas are selected to prevent the light curable adhesive 86 from spreading to locations which will not be exposed to curing light, such as the top or underside of the optical system 46.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A stray light baffle for reducing an amount of stray light incident on a detector, said stray light baffle comprising a main body portion and a mounting pad portion, the mounting pad portion allowing said stray light baffle to be affixed to a mounting surface with a light curable adhesive, the light curable adhesive curing in response to curing light incident thereon, the mounting surface being located adjacent the detector so that said main body portion is interposed between the detector and a source of stray light when the stray light baffle is mounted to the mounting surface, the main body portion and the mounting pad portion of said stray light baffle substantially transmitting curing light and substantially blocking stray light.

2. The stray light baffle of claim 1, wherein the mounting pad portion of said stray light baffle has a transmittance between about 50% and about 75% for curing light.

3. The stray light baffle of claim 1, wherein the main body portion of said stray light baffle has a transmittance between about 5% and about 7% for stray light.

4. A scanner, comprising:
 a detector, said detector producing an image data signal in response to image light incident thereon;
 an optical system positioned between said detector and an object being scanned, said optical system directing and focusing image light from the object onto said detector; and
 a stray light baffle having a main body portion and a mounting pad portion, the mounting pad portion allowing said stray light baffle to be affixed to a mounting surface with a light curable adhesive, the light curable adhesive curing in response to curing light incident thereon, the mounting surface being located adjacent the detector so that said main body portion is interposed between the detector and a source of stray light when the stray light baffle is mounted to the mounting surface, the main body portion of said stray light baffle substantially transmitting curing light and substantially blocking stray light.

5. The scanner of claim 4, wherein the main body portion of said stray light baffle has a transmittance between about 50% and about 75% for curing light.

6. The scanner of claim 5, wherein the main body portion of said stray light baffle has a transmittance between about 5% and about 7% for stray light.

7. The scanner of claim 6, wherein said optical system comprises a lens assembly and wherein said stray light baffle is mounted to said lens assembly.

8. The scanner of claim 7, wherein said detector comprises a CCD array.

9. A system for detecting image light, comprising:
 a detector; and
 a stray light baffle positioned adjacent said detector and mounted to a mounting surface with a light curable adhesive, the light curable adhesive curing in response to curing light, said stray light baffle substantially transmitting the curing light and substantially blocking stray light.

10. The system of claim 9, wherein said stray light baffle substantially blocks stray light having wavelengths between about 580 nm and about 600 nm.

11. The system of claim 9, wherein said stray light baffle substantially transmits curing light having wavelengths between about 390 nm and about 500 nm.

12. The system of claim 9, wherein said stray light baffle has a transmittance between about 5% and about 7% for stray light.

13. The system of claim 9, wherein said stray light baffle has a transmittance between about 50% and about 75% for curing light.

14. The system of claim 9, wherein said stray light baffle is substantially coextensive with said detector so that said stray light baffle is positioned between said detector and a source of stray light.

15. The system of claim 9, wherein said detector includes a detection field, and wherein said mounting surface comprises an optical system positioned in the detection field of said detector for directing and focusing image light onto said detector.

16. The system of claim 9, further comprising a sensor printed circuit board, said detector being electrically and physically connected to said sensor printed circuit board with a plurality of wire bonds, said stray light baffle extending over said wire bonds whereby said wire bonds are protected.

17. The system of claim 16, wherein said stray light baffle includes an alignment tab for aligning said stray light baffle adjacent said sensor printed circuit board.

18. A system for attenuating stray light incident on a detector, comprising:

a mounting surface in proximity with said detector;

an adhesive layer deposited on at least a portion of said mounting surface and curing in response to curing light; and a stray light baffle mounted to said mounting surface by said adhesive layer, said stray light baffle being positioned between said detector and a source of stray light, said stray light baffle substantially transmitting the curing light and substantially blocking the stray light.

19. The system of claim 18, wherein said stray light baffle is substantially coextensive with said detector.

20. The system of claim 18, wherein said stray light baffle includes one or more ribs to provide rigidity.

21. The system of claim 18, wherein said stray light baffle extends over said detector to provide physical protection to said detector.

22. A method for mounting a stray light baffle adjacent an optical detector, comprising:

providing an adhesive which cures in the presence of curing light;

depositing said adhesive on a mounting surface in proximity with said optical detector;

providing a baffle which substantially transmits the curing light and substantially blocks stray light;

placing said baffle in contact with said adhesive layer; and illuminating said adhesive layer with curing light through said baffle for a time sufficient to cure said adhesive layer.

23. The method of claim 22, wherein placing said baffle in contact with said adhesive layer further comprises positioning said baffle between the optical detector and a source of stray light so that said baffle substantially prevents stray light from reaching the optical detector.

24. The method of claim 22, wherein said adhesive cures in response to light with a wavelength between about 320 nm and about 500 nm.

25. The method of claim 22, wherein said baffle has a transmittance between about 5% and 7% for stray light.

26. The method of claim 22, wherein said baffle has a transmittance between about 50% and 75% for curing light.

27. The method of claim 22, wherein depositing said adhesive on a mounting surface first comprises selecting target locations for said adhesive on said mounting surface, then depositing said adhesive in said target locations.

* * * * *